US010204074B1

(12) United States Patent
Diller et al.

(10) Patent No.: US 10,204,074 B1
(45) Date of Patent: Feb. 12, 2019

(54) ONLINE PROFESSIONAL SERVICES STOREFRONT

(75) Inventors: Jonathan P Diller, Soquel, CA (US); Sunny SunMin Song, Los Altos, CA (US); Fabio Rosati, Palo Alto, CA (US)

(73) Assignee: ELANCE, INC., Mountain View, CA (US)

( * ) Notice: Subject to any disclaimer, the term of this patent is extended or adjusted under 35 U.S.C. 154(b) by 0 days.

(21) Appl. No.: 12/474,127

(22) Filed: May 28, 2009

Related U.S. Application Data

(60) Provisional application No. 61/131,920, filed on Jun. 12, 2008.

(51) Int. Cl.
*G06F 17/30* (2006.01)
*H04M 3/42* (2006.01)
*G06F 15/16* (2006.01)

(52) U.S. Cl.
CPC ........ *G06F 15/16* (2013.01); *H04M 3/42229* (2013.01)

(58) Field of Classification Search
USPC ................................................ 705/7; 707/10
See application file for complete search history.

(56) References Cited

U.S. PATENT DOCUMENTS

| 4,703,325 A | 10/1987 | Chamberlin et al. | |
|---|---|---|---|
| 4,799,156 A | 1/1989 | Shavit et al. | 364/401 |
| 5,008,853 A | 4/1991 | Bly et al. | 364/900 |
| 5,220,657 A | 6/1993 | Bly et al. | |
| 5,548,506 A | 8/1996 | Srinivasan | |
| 5,557,515 A | 9/1996 | Abbruzzese et al. | |
| 5,592,620 A | 1/1997 | Chen et al. | |
| 5,664,115 A | 9/1997 | Fraser | 705/37 |
| 5,715,402 A | 2/1998 | Popolo | 395/237 |
| 5,732,400 A | 3/1998 | Mandler et al. | 705/26 |

(Continued)

FOREIGN PATENT DOCUMENTS

| EP | 0 952 536 A1 | 10/1999 | G06F 17/60 |
|---|---|---|---|
| WO | WO 01/15050 A1 | 3/2001 | |

(Continued)

OTHER PUBLICATIONS

Davenport, Thomas H. and Keri Pearlson, "Two Cheers for the Virtual Office", summer 1998, abstract, retrieved from the Internet: <URL: http://www.pubservice.com/MSStore?ProductDetails.aspx?CPC=3944>.

(Continued)

*Primary Examiner* — Talia F Crawley
(74) *Attorney, Agent, or Firm* — Haverstock & Owens LLP

(57) ABSTRACT

An online professional profile includes static data commonly found in a print resume and dynamically generated information. The static data includes skills and credentials. The dynamically generated information includes a portfolio of completed work products uploaded by a service provider, feedback provided by an at least one past buyer, and an interactive window configured to display an image, a video clip, and/or an audio clip. The online professional profile has a Contact Me button configured to provide communication with the service provider. A potential buyer is able to review the online professional profile and make an instant, informed hiring decision.

26 Claims, 5 Drawing Sheets

(56) References Cited

U.S. PATENT DOCUMENTS

| | | | |
|---|---|---|---|
| 5,794,207 A | 8/1998 | Walker et al. ............... 705/23 |
| 5,835,896 A | 11/1998 | Fisher et al. ............... 705/37 |
| 5,842,178 A | 11/1998 | Giovannoli ............... 705/26 |
| 5,862,223 A | 1/1999 | Walker et al. ............... 380/25 |
| 5,905,975 A | 5/1999 | Ausubel ............... 705/37 |
| 5,924,082 A | 7/1999 | Silverman et al. ............... 705/37 |
| 5,949,976 A | 9/1999 | Chappelle |
| 5,956,715 A | 9/1999 | Glasser et al. ............... 707/9 |
| 5,966,130 A | 10/1999 | Benman, Jr. |
| 5,987,498 A | 11/1999 | Athing et al. ............... 709/203 |
| 6,009,154 A | 12/1999 | Rieken et al. ............... 379/114 |
| 6,041,307 A | 3/2000 | Ahuja et al. ............... 705/8 |
| 6,049,777 A | 4/2000 | Sheena et al. ............... 705/10 |
| 6,061,665 A | 5/2000 | Bahreman ............... 705/40 |
| 6,064,980 A | 5/2000 | Jacobi et al. ............... 705/26 |
| 6,078,906 A | 6/2000 | Huberman ............... 705/37 |
| 6,092,049 A | 7/2000 | Chislenko et al. |
| 6,101,482 A | 8/2000 | DiAngelo et al. ............... 705/26 |
| 6,119,101 A | 9/2000 | Peckover ............... 705/26 |
| 6,119,149 A | 9/2000 | Notani |
| 6,128,624 A | 10/2000 | Papierniak et al. ............... 707/14 |
| 6,141,653 A | 10/2000 | Conklin et al. ............... 705/80 |
| 6,154,731 A | 11/2000 | Monks et al. ............... 705/35 |
| 6,161,099 A | 12/2000 | Harrington et al. ............... 705/37 |
| 6,208,659 B1 | 3/2001 | Covindarajan et al. |
| 6,223,177 B1 | 4/2001 | Tatham et al. ............... 707/9 |
| 6,226,031 B1 | 5/2001 | Barraclough et al. |
| 6,233,600 B1 | 5/2001 | Salas et al. ............... 709/201 |
| 6,311,178 B1 | 10/2001 | Bi et al. ............... 707/3 |
| 6,336,105 B1 | 1/2002 | Conklin et al. ............... 705/80 |
| 6,374,292 B1 | 4/2002 | Srivastava et al. ............... 709/206 |
| 6,385,620 B1 | 5/2002 | Kurzius et al. |
| 6,415,270 B1 | 7/2002 | Rackson et al. ............... 705/37 |
| 6,415,284 B1 | 7/2002 | D'Souza et al. |
| 6,442,528 B1 | 8/2002 | Notani et al. ............... 705/9 |
| 6,484,153 B1 | 11/2002 | Walker et al. ............... 705/38 |
| 6,557,035 B1 | 4/2003 | McKnight |
| 6,564,246 B1 | 5/2003 | Varma et al. ............... 709/205 |
| 6,567,784 B2 | 5/2003 | Bukow ............... 705/9 |
| 6,591,011 B1 | 7/2003 | Nielsen |
| 6,598,026 B1 | 7/2003 | Ojha et al. ............... 705/26 |
| 6,618,734 B1 | 9/2003 | Williams |
| 6,662,194 B1 | 12/2003 | Joao |
| 6,735,570 B1 * | 5/2004 | Lacy ............... G06Q 10/063112 |
| | | 705/7.14 |
| 6,832,176 B2 | 12/2004 | Hartigan et al. |
| 6,859,523 B1 | 2/2005 | Jilk |
| 6,871,181 B2 | 3/2005 | Kansai |
| 6,931,385 B1 | 8/2005 | Halstead et al. |
| 6,938,048 B1 | 8/2005 | Jilk et al. |
| 7,069,242 B1 | 6/2006 | Sheth et al. ............... 705/37 |
| 7,096,193 B1 * | 8/2006 | Beaudoin ............... G06Q 10/06311 |
| | | 705/26.1 |
| 7,155,400 B1 | 12/2006 | Jilk et al. |
| 7,310,415 B1 | 12/2007 | Short |
| 7,346,535 B2 | 3/2008 | Younger |
| 7,406,443 B1 | 7/2008 | Fink et al. |
| 7,437,327 B2 | 10/2008 | Lam et al. |
| 7,444,374 B1 | 10/2008 | Baker |
| 7,466,810 B1 * | 12/2008 | Quon ............... H04M 3/42229 |
| | | 379/201.01 |
| 7,505,919 B2 | 3/2009 | Richardson |
| 7,587,336 B1 | 9/2009 | Wallgren et al. |
| 7,778,938 B2 | 8/2010 | Stimac |
| 7,814,085 B1 | 10/2010 | Pfleger et al. |
| 7,966,265 B2 | 6/2011 | Schalk et al. |
| 8,024,670 B1 | 9/2011 | Rahmatian |
| 8,156,051 B1 | 4/2012 | Shah |
| 8,224,755 B2 | 7/2012 | Goodman et al. |
| 8,380,709 B1 | 2/2013 | Diller et al. |
| 8,504,403 B2 | 8/2013 | Deich |
| 8,517,742 B1 | 8/2013 | Johnson |
| 8,682,683 B2 | 3/2014 | Ananian |
| 8,700,694 B2 | 4/2014 | Archbold |
| 8,843,388 B1 | 9/2014 | Westfall |
| 8,856,670 B1 | 10/2014 | Thakur et al. |
| 9,020,271 B2 | 4/2015 | Deolalikar et al. |
| 9,454,576 B1 | 9/2016 | Kapoor |
| 2001/0011222 A1 | 8/2001 | McLauchlin et al. ............... 705/1 |
| 2001/0032170 A1 | 10/2001 | Sheth ............... 705/37 |
| 2001/0034630 A1 * | 10/2001 | Mayer ............... G06Q 10/063112 |
| | | 705/7.14 |
| 2001/0034688 A1 | 10/2001 | Annunziata |
| 2001/0041988 A1 | 11/2001 | Lin |
| 2002/0007300 A1 | 1/2002 | Slatter |
| 2002/0010685 A1 | 1/2002 | Ashby |
| 2002/0023046 A1 | 2/2002 | Callahan et al. ............... 705/37 |
| 2002/0026398 A1 | 2/2002 | Sheth ............... 705/37 |
| 2002/0052773 A1 | 5/2002 | Kraemer |
| 2002/0054138 A1 | 5/2002 | Hennum |
| 2002/0069031 A1 | 6/2002 | Lehman |
| 2002/0078432 A1 | 6/2002 | Charisius et al. |
| 2002/0103687 A1 | 8/2002 | Kipling |
| 2002/0120522 A1 | 8/2002 | Yang ............... 705/26 |
| 2002/0120554 A1 | 8/2002 | Vega |
| 2002/0129139 A1 | 9/2002 | Ramesh |
| 2002/0133365 A1 | 9/2002 | Grey et al. |
| 2002/0194077 A1 | 12/2002 | Dutta |
| 2002/0194112 A1 | 12/2002 | dePinto et al. |
| 2003/0004738 A1 | 1/2003 | Chandar |
| 2003/0014294 A1 | 1/2003 | Yoneyama et al. |
| 2003/0046155 A1 | 3/2003 | Himmel et al. |
| 2003/0050811 A1 | 3/2003 | Freeman, Jr. |
| 2003/0055780 A1 | 3/2003 | Hansen et al. |
| 2003/0061266 A1 | 3/2003 | Ouchi |
| 2003/0086608 A1 | 5/2003 | Frost |
| 2003/0097305 A1 | 5/2003 | Ogino et al. |
| 2003/0101126 A1 | 5/2003 | Cheung et al. |
| 2003/0120603 A1 | 6/2003 | Kojima et al. |
| 2003/0182171 A1 | 9/2003 | Vianello |
| 2003/0191684 A1 * | 10/2003 | Lumsden ............... G06Q 10/063112 |
| | | 705/7.14 |
| 2003/0212246 A1 | 11/2003 | Eleveld |
| 2003/0212627 A1 | 11/2003 | Burns et al. |
| 2003/0220843 A1 | 11/2003 | Lam et al. |
| 2003/0233372 A1 | 12/2003 | Warner |
| 2004/0063463 A1 | 4/2004 | Boivin |
| 2004/0064436 A1 | 4/2004 | Breslin et al. |
| 2004/0103167 A1 | 5/2004 | Grooters et al. |
| 2004/0122926 A1 | 6/2004 | Moore et al. |
| 2004/0128224 A1 | 7/2004 | Dabney et al. |
| 2004/0215560 A1 | 10/2004 | Amalraj et al. |
| 2004/0230466 A1 | 11/2004 | Davis et al. |
| 2004/0230511 A1 | 11/2004 | Kannan et al. |
| 2004/0230521 A1 | 11/2004 | Broadbent et al. |
| 2004/0241627 A1 | 12/2004 | Delfing |
| 2004/0243428 A1 | 12/2004 | Black |
| 2005/0033633 A1 | 2/2005 | LaPasta |
| 2005/0043998 A1 | 2/2005 | Bross et al. |
| 2005/0097613 A1 | 5/2005 | Ulate et al. |
| 2005/0131830 A1 | 6/2005 | Juarez et al. |
| 2005/0177380 A1 | 8/2005 | Pritchard et al. |
| 2005/0222907 A1 * | 10/2005 | Pupo ............... G06Q 30/02 |
| | | 705/14.73 |
| 2006/0031177 A1 | 2/2006 | Rule |
| 2006/0074708 A1 * | 4/2006 | Woods ............... G06F 19/363 |
| | | 705/2 |
| 2006/0080116 A1 | 4/2006 | Maguire |
| 2006/0095366 A1 | 5/2006 | Sheth et al. ............... 705/37 |
| 2006/0106846 A1 | 5/2006 | Schulz |
| 2006/0122850 A1 | 6/2006 | Ward et al. |
| 2006/0143228 A1 | 6/2006 | Odio-Paez |
| 2006/0177041 A1 | 8/2006 | Warner et al. |
| 2006/0195428 A1 | 8/2006 | Peckover |
| 2006/0212359 A1 | 9/2006 | Hudgeon |
| 2006/0284838 A1 | 12/2006 | Tsatalos |
| 2007/0005536 A1 | 1/2007 | Caswell et al. |
| 2007/0022040 A1 | 1/2007 | Gordon |
| 2007/0027746 A1 | 2/2007 | Grabowich |
| 2007/0061144 A1 | 3/2007 | Grichnik et al. |
| 2007/0067196 A1 | 3/2007 | Usui |
| 2007/0073610 A1 | 3/2007 | Marugabandhu et al. |
| 2007/0078699 A1 | 4/2007 | Scott et al. |
| 2007/0088601 A1 | 4/2007 | Money et al. |

(56) References Cited

U.S. PATENT DOCUMENTS

| | | |
|---|---|---|
| 2007/0162379 A1 | 7/2007 | Skinner |
| 2007/0174180 A1 | 7/2007 | Shin |
| 2007/0174394 A1 | 7/2007 | Jayaweera |
| 2007/0185723 A1 | 8/2007 | Shellnutt |
| 2007/0192130 A1* | 8/2007 | Sandhu ............ G06Q 10/1053 705/321 |
| 2007/0233510 A1 | 10/2007 | Howes |
| 2008/0010598 A1 | 1/2008 | Smilowitz et al. |
| 2008/0046834 A1 | 2/2008 | Yu et al. |
| 2008/0059267 A1 | 3/2008 | Hamilton |
| 2008/0059523 A1* | 3/2008 | Schmidt ................. G09B 7/02 |
| 2008/0065444 A1 | 3/2008 | Stroman et al. |
| 2008/0091774 A1 | 4/2008 | Taylor et al. |
| 2008/0104495 A1 | 5/2008 | Craig |
| 2008/0134292 A1 | 6/2008 | Ariel et al. |
| 2008/0154783 A1 | 6/2008 | Rule et al. |
| 2008/0184135 A1 | 7/2008 | Washburn et al. |
| 2008/0192130 A1 | 8/2008 | Noh |
| 2008/0209417 A1 | 8/2008 | Jakobson |
| 2008/0244582 A1 | 10/2008 | Brown et al. |
| 2008/0294505 A1 | 11/2008 | Markowitz et al. |
| 2008/0294688 A1 | 11/2008 | Brousard |
| 2008/0313005 A1 | 12/2008 | Nessland et al. |
| 2009/0011395 A1* | 1/2009 | Schmidt ................... G09B 5/00 434/322 |
| 2009/0017788 A1 | 1/2009 | Doyle et al. |
| 2009/0055404 A1* | 2/2009 | Heiden .................. G06Q 30/02 |
| 2009/0055476 A1 | 2/2009 | Marcus et al. |
| 2009/0112728 A1 | 4/2009 | Evers et al. |
| 2009/0116403 A1 | 5/2009 | Callanan et al. |
| 2009/0132345 A1 | 5/2009 | Meyssami et al. |
| 2009/0150386 A1 | 6/2009 | Lichtblau |
| 2009/0177691 A1 | 7/2009 | Manfredi et al. |
| 2009/0199185 A1 | 8/2009 | Slawson et al. |
| 2009/0210282 A1 | 8/2009 | Elenbaas et al. |
| 2009/0241035 A1 | 9/2009 | Tseng et al. |
| 2009/0241172 A1 | 9/2009 | Sennett et al. |
| 2009/0249340 A1 | 10/2009 | Akiyama et al. |
| 2009/0265205 A1 | 10/2009 | Stinchcombe et al. |
| 2009/0288021 A1 | 11/2009 | Ioffe et al. |
| 2009/0327081 A1 | 12/2009 | Wang et al. |
| 2010/0017253 A1* | 1/2010 | Butler ..................... G06Q 10/06 705/7.14 |
| 2010/0088749 A1 | 4/2010 | Steeples |
| 2010/0144318 A1 | 6/2010 | Cable |
| 2010/0161503 A1 | 6/2010 | Foster |
| 2010/0162167 A1 | 6/2010 | Stallings et al. |
| 2010/0250322 A1 | 9/2010 | Norwood |
| 2010/0287525 A1 | 11/2010 | Wagner |
| 2010/0324948 A1 | 12/2010 | Kumar et al. |
| 2011/0106762 A1 | 5/2011 | Dane et al. |
| 2011/0107088 A1 | 5/2011 | Eng et al. |
| 2011/0131146 A1 | 6/2011 | Skutnik |
| 2011/0208665 A1 | 8/2011 | Hirsch |
| 2011/0238768 A1 | 9/2011 | Habets et al. |
| 2011/0302053 A1 | 12/2011 | Rigole |
| 2012/0041832 A1 | 2/2012 | Sheth et al. |
| 2012/0110087 A1 | 5/2012 | Culver et al. |
| 2012/0143952 A1 | 6/2012 | Von Graf |
| 2012/0150761 A1 | 6/2012 | Ananian |
| 2013/0246294 A1 | 9/2013 | Pendyala et al. |
| 2013/0325734 A1 | 12/2013 | Bixler et al. |
| 2014/0074738 A1 | 3/2014 | Thankappan et al. |
| 2014/0108078 A1 | 4/2014 | Davis |
| 2014/0164271 A1 | 6/2014 | Forman et al. |
| 2014/0222493 A1 | 8/2014 | Mohan et al. |
| 2014/0358646 A1 | 12/2014 | Said et al. |
| 2014/0377723 A1 | 12/2014 | Strong |
| 2015/0032654 A1 | 1/2015 | Huff |
| 2015/0134600 A1 | 5/2015 | Eisner et al. |
| 2015/0206080 A1 | 7/2015 | Izaguirre |
| 2016/0012135 A1 | 1/2016 | Wang et al. |

FOREIGN PATENT DOCUMENTS

| | | | | |
|---|---|---|---|---|
| WO | WO 01/73645 A1 | 10/2001 | ............ | G06F 17/60 |
| WO | WO 02/61531 A2 | 8/2002 | ............ | G06F 17/60 |

OTHER PUBLICATIONS

PCT International Search Report and Written Opinion, PCT/US06/22734, dated Jun. 3, 2008, 5 pages.
U.S. Appl. No. 09/644,665, filed Aug. 24, 2000, Sheth et al.
U.S. Appl. No. 12/287,994, filed Oct. 14, 2008, Diller et al.
U.S. Appl. No. 12/287,997, filed Oct. 14, 2008, Diller et al.
U.S. Appl. No. 60/206,203, filed May 22, 2000, Anumolu et al.
U.S. Appl. No. 60/999,147, filed Oct. 15, 2007, Diller et al.
U.S. Appl. No. 61/131,920, filed Jun. 11, 2008, Diller et al.
ants.com web pages [online]. Ants.com [retrieved on Aug. 22, 2008]. Retrieved from the Internet: <URL: http://www.ants.com/ants/>.
bizbuyer.com web pages [online]. BizBuyer.com, Inc. [retrieved Aug. 18-21, 2000]. Retrieved from the Internet: <URL: http://www.bizbuyer.com/>.
BullhornPro web pages [online]. Bullhorn, Inc. [retrieved on Jan. 4, 2001]. Retrieved from the Internet: <URL: http://www.bullhornpro.com/>.
Cassidy, M., "Going for Broke," San Jose Mercury News, Monday, Aug. 16, 1999, pp. 1E and 4E, published in San Jose, CA.
efrenzy.com web pages [online]. eFrenzy, Inc. [retrieved on Aug. 22, 2000]. Retrieved from the Internet: <URL: http://www.efrenzy.com/index.isp>.
Eisenberg, D. "We're for Hire, Just Click," Time Magazine, Aug. 16, 1999, vol. 154, No. 7 [online] [retrieved on Aug. 19, 1999]. Retrieved from the Internet: <URL: http://www.pathfinder.com/time/magazine/articles/0,3266,29393,00.html>.
eworkexchange.com web pages [online]. eWork Exchange, Inc. [retrieved on Aug. 18-22, 2000]. Retrieved from the Internet: <URL: http://www.eworks.com/>.
EWork Exchange web pages [online]. eWork Exchange, Inc. [retrieved on Jan. 5, 2001]. Retrieved from the Internet: <URL: http://www.eworks.com/>.
EWork ProSource web pages [online]. eWork Exchange, Inc. [retrieved on Jan. 3, 2001]. Retrieved from the Internet: <URL: http://www.ework.com/>.
FeeBid.com web pages [online]. FeeBid.com [retrieved on Dec. 18, 2000]. Retrieved from the Internet: <URL: http://www.feebid.com>.
freeagent.com web pages [online]. FreeAgent.com [retrieved Aug. 18-22, 2000]. Retrieved from the Internet: <URL: http://www.freeagent.com/>.
guru.com web pages [online]. Guru.com, Inc. [retrieved Aug. 18, 2000]. Retrieved from the Internet: <URL: http://www.guru.com/>.
Herhold, S., "Expert Advice is Collectible for Start-up," San Jose Mercury News, Monday, Aug. 16, 1999, pp. 1E and 6E, San Jose, CA.
hotdispatch.com web pages [online]. HotDispatch, Inc. [retrieved on Aug. 22, 2000]. Retrieved from the Internet: <URL: http://www.hotdtspatch.com/>.
Humphreys, Paul et al., "A Just-in-Time Evaluation Strategy for International Procurement," MCB UP Limited, 1998, pp. 1-11.
"IBNL Forges Into the Future of Buying and Selling with Source Interactive Software," PR Newswire, Jan. 10, 1996. [replacement copy retrieved on May 4, 2009]. Retrieved from Internet: <URL: http://www.highbeam.com>.
imandi.com web pages [online]. Imandi Corporation [retrieved on Aug. 22, 2000]. Retrieved from the Internet: <URL: http://www.imandi.com/>.
Malone, Thomas W. et al., "The Dawn of the E-Lance Economy," Harvard Business Review, Sep.-Oct. 1998, pp. 145-152.
"Netscape Selects Netopia as the Exclusive 'Virtual Office' Offering on the New Netscape Small Business Source Service," PR Newswire, May 11, 1998, Mountain View and Alameda, California.

(56) References Cited

OTHER PUBLICATIONS onvia.com web pages [online]. Onvia.com [retrieved Aug. 22, 2000]. Retrieved from the Internet: <URL: http://www.onvia.com/usehome/index.cfm>.

Opus360 web pages [online]. Opus360 Corporation [retrieved on Jan. 3, 2001] Retrieved from the Internet: <URL: http://www.opus360.com/>.

smarterwork.com web pges [online]. smarterwork.com, Inc. [retrieved on Aug. 22, 2000]. Retrieved from the Internet: <URL: http://www.smarterwork.com/>.

workexchange.com web pages [online]. WorkExchange, Inc. [retrieved Aug. 22, 2000]. Retrieved from the Internet: <URL: http://www.workexchange.com/unique/workexchange/index1.cfm>.

Shalil Majithia et al, "Reputation-based Semantic Service Discovery", IEEE Computer Society, 13th IEEE International Workshops on Enabling Technologies:Infrastructure for Collaborative Enterprises, 2004, pp. 1-6.

Ziqiang Xu et al, "Reputation-Enhanced QoS-based Web Services Discovery", School of Computing, Queen's University, Canada, 2007, pp. 1-8.

Massimo Paolucci et al. "Semantic Matching of Web Services Capabilities" Carnegie Mellon University, 2002, Springer-Verlag Berlin Heidelberg, p. 333-347.

morebusiness.com, "How to Write Winning Business Proposals: Writing Strategies," cited in Office Action dated Oct. 6, 2011, <http://www.morebusiness.com/running_your_business/management/v1n11.brc>, published Aug. 1, 1998.

University of Wisconsin—Eau Claire LTS Online Help Documentation, Microsoft Excel 2003/2004, using the Sort Command, https://web.archive.org/web/20080311184836/http://www.uwec.edu/Help/Excel03/srtcom.htm,Mar. 11, 2008,retrieved Oct. 1, 2014.

Paolucci et al., "Semantic Matching of Web Services Capabilities", 2002, Carnegie Mellon University, Pittsburgh, PA, USA.

Muhl, Charles J. "What Is an Employee—The Answer Depends on the Federal Law." Monthly Lab. Rev. 125(2002): 9 pages.

Barton, Lisa Horwedel "Reconciling the independent contractor versus employee dilemma: a discussion of current developments as they relate to employee benefit plans." Cap. UL Rev 29 (2001): 63 pages.

Moran, Jenna Amato "Independent Contractor or Employee-Misclassification of Workers and Its Effect of the State." Buff. Pub. Int. LJ 28 (2009): 28 pages.

Webb, Teresa J., et al. "An empirical assist in resolving the classification dilemma of workers as either employees or independent contractors." Journal of Applied Business Research (JABR) 24. (2011): 22 pages.

Wood, Robert W. "Defining Employees and Independent Contractors." Bus. L. Today 17 (2007): 6 pages.

D'Aurizio, Patricia. "Human Resource Solutions Onboarding: Delivering the Promise". Nursing Economics 25.4 (2007): 228, year 2007.

Graybill, Jolie O., et al., "Employee Onboarding: Identification of Best Practices in ACRL Libraries", Library Management 34.3, (2013), 200-218. (Year: 2013).

\* cited by examiner

About Us ~120
Profile Type: Business
Year Founded: August 1, 2002
Number of Employees: 12

At Sample Company we believe in satisfaction guaranteed and we think big so you don't have to.

Payment Terms ~125

50% deposit and remaining 50% due when the job is done and clients are totally satisfied or depending on milestones agreed before projects starts. We accept payments through Elance Billing and Payment System.

Detailed Service Description ~135
More than 10 years of experience in the following design fields:

-logotypes
-Flash Animation
-Web design

Credentials ~110
References:
John Doe - Personal Reference - 2002    verified ~115
Date Verified: May 20, 2004
johndoe.com, President
Coporate Identity Package Find: | | ⇧ Next  ⇩ Previous  ▢ Highlight All  ☐ Match Case

Fig. 1B

| Team Account | | | | |
|---|---|---|---|---|
| Name | Username | Role | Assigned Jobs | Actions |
| 1. Jane Doe | Jane_Doe | Owner | 1 | Edit |
| 2. John Smith | John_Smith | Administrator | 0 | Edit/Delete |
| 3. Peter Davis | Pete_Davis | Manager | 1 | Edit/Delete |
| 4. Cynthia Oliver | Consultant1 | Consultant | 2 | Edit/Delete |

5. Add Team Member — 530

6. Add Team Member

ONLINE PROFESSIONAL SERVICES STOREFRONT

CROSS REFERENCE TO RELATED APPLICATIONS

The application claims priority of U.S. provisional application, Ser. No. 61/131,920, filed Jun. 12, 2008, and entitled "Online Professional Profile," by the same inventors. This application incorporates U.S. provisional application, Ser. No. 61/131,920, in its entirety by reference.

FIELD OF THE INVENTION

The present invention relates to online profiles. More particularly, the present invention relates to an online professional profile.

BACKGROUND OF THE INVENTION

A job posting site allows job seekers to post resumes and search for jobs. The job posting site also allows employers to post the jobs and browse through the resumes to search for qualified job seekers. However, prior art job posting sites suffer from a number of shortcomings. For example, the job posting site allows the job seekers to post only static information about themselves. As such, the job seekers are not able to actively market themselves to the employers. In addition, the employers are not able to make an instant, informed hiring decision based on the static information.

The present invention addresses at least these limitations in the prior art.

SUMMARY OF THE INVENTION

An object of the present invention is to provide an online professional profile within a services exchange medium. In the services exchange medium, buyers find and hire service providers "on demand" to get projects done quickly and cost effectively. Specifically, buyers post projects and service providers search for projects to work on.

In one aspect, a professional profile accessible on a computing device comprising static data commonly found in a print resume. The static data includes skills and credentials. Typically, proficiency of each skill is self-assessed or determined by a test. Each of the credentials is verifiable by using a verification service. The professional profile also comprises dynamic information, wherein a first portion of the dynamic information is provided by the service provider, a second portion of the dynamic information is automatically generated, and a third portion of the dynamic information is provided by an at least one buyer. In some embodiments, the first portion includes a portfolio of completed work products uploaded by the service provider. The first portion also includes at least one interactive window configured to display an image, a video clip, and/or an audio clip. The second portion includes experience which automatically expands as projects are completed. The third portion includes feedback statistics based on feedback provided by the at least one buyer. In some embodiments, the professional profile also includes a Contact Me button configured to provide communication with the service provider. Typically, the communication is a chat, a call, or an invitation to bid. In other embodiments, the professional profile is configured as a team account to allow people in a company to organize as a team and work together.

In another aspect, an online profile accessible on a computing device comprises data commonly found in a print resume. In some embodiments, the data is grouped into sections including an experience section, a skills section, and a credentials section. The experience section is automatically generated and expands as projects are completed. The skills section is configured to allow the service provider to self-assess or to take tests to assess proficiency of skills listed therein. The credentials section lists credentials. The credentials are verifiable by using a verification service. The online profile also comprises a portfolio including work products completed by a service provider and at least one interactive window. The at least one interactive window displays an image, a video clip, or an audio clip. In some embodiments, the online profile also comprises an at least one keyword. Typically, the at least one keyword is associated with a professional ability of the service provider. In other embodiments, the online profile also comprises a Contact Me button configured to provide communication with the service provider. Typically, the communication is a chat, a call, or an invitation to bid. Yet, in other embodiments, the online profile also comprises feedback provided by a buyer. Typically, the feedback is associated with a project completed by the service provider. Yet, in other embodiments, the online profile is configured a team account to allow people in a company to organize as a team and work together.

Yet, in another aspect, a system for actively marketing professional services includes a service provider looking for a project and a profile created by the service provider. Typically, the profile includes professional information. In some embodiments, the professional information includes skills. The proficiency of each skill is typically self-assessed or determined by a test. In some embodiments, the professional information includes data commonly found in a print resume. In some embodiments, the professional information also includes feedback from an at least one past buyer. In other embodiments, the professional information also includes a portfolio of work products completed by the service provider. Yet, in other embodiments, the professional information includes experience which expands as projects are completed. The profile also includes at least one interactive display configured to present an image, a video clip, or an audio clip. In some embodiments, the profile further includes a Contact Me button configured to provide communication with the service provider. Typically, the communication is a chat, a call, or an invitation to bid. The system also includes a potential buyer. Typically, the profile enables the potential buyer to make an instant, informed hiring decision. In other embodiments, the profile is configured as a team account to allow people in a company to organize as a team and work together.

BRIEF DESCRIPTION OF THE DRAWINGS

FIG. 1B illustrates a second portion of the exemplary online professional profile provided on the web browser in accordance with some embodiments of the present invention.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein or with equivalent alternatives.

In a preferred embodiment, the steps of the present invention are embodied in machine-executable instructions. These instructions can be used to cause a general-purpose or special-purpose processor that is programmed with the instructions to perform the steps of the present invention. Alternatively, the steps of the present invention can be performed by specific hardware components that contain hardwired logic for performing the steps, or by any combination of programmed computer components and custom hardware components.

Reference will now be made in detail to implementations of the present invention as illustrated in the accompanying drawings. The same reference indicators will be used throughout the drawings and the following detailed description to refer to the same or like parts.

Embodiments of the present invention are directed to an online professional profile within a services exchange medium. Preferably, in the services exchange medium, buyers search and hire service providers "on demand" to get projects done quickly and cost effectively. In the services exchange medium, a service provider is able to create an online professional profile in order to be immediately connected to a buyer looking for the service provider's expertise. Typically, the service provider's online professional profile describes the service provider's professional abilities. The buyer is able to review the service provider's online professional profile to make an instant, informed hiring decision. In some embodiments, the online professional profile is organized into different sections, pages, or both for clarity. In other embodiments, the buyer is able to view the service provider's online professional profile on a web browser of a computing device. Preferably, the computing device is an Internet-ready device. The computing device is a personal computer, laptop computer, computer workstation, a server, mainframe computer, handheld computer, personal digital assistant, cellular/mobile telephone, smart appliance, gaming console or any other Internet-ready device.

Within the services exchange medium, the service provider can be an individual or a business. Similarly, within the services exchange medium, the buyer can be an individual or a business.

Figure 1A:
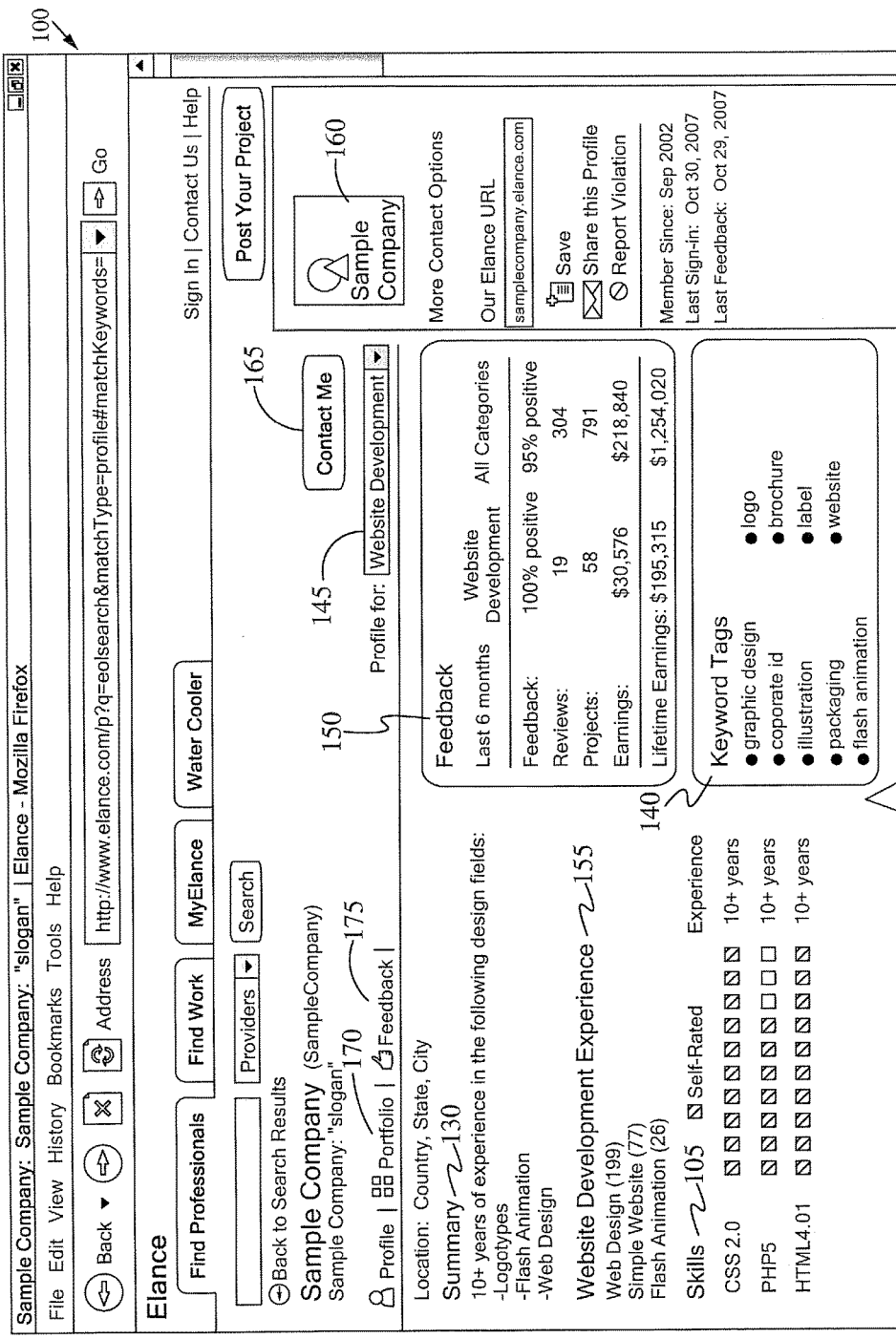
FIG. 1A illustrates a first portion of an exemplary online professional provided on a web browser in accordance with some embodiments of the present invention.

FIGS. 1A-1B illustrate an exemplary online professional profile 100 provided on a web browser in accordance with the present invention. In some embodiments, the service provider's online professional profile 100 includes static data commonly found in a print resume and dynamically generated data. Typically, the static data commonly found in the print resume includes skills and credentials. Under a Skills section 105, the service provider's skills are listed. In some embodiments, each skill is associated with a self-assessment and a number of years of experience. Typically, the self-assessment is based on a quantitative scale of 10. Other quantitative scales are possible. Alternatively, the self-assessment is based on a qualitative analysis. In other embodiments, each skill is also associated with a date that the service provider had last used that skill.

Instead of self-assessing a skill, the service provider in some embodiments is able to certify the skill by taking an online test, although this is required. Alternatively, certification is required for each skill listed. The online test is typically generated and hosted by the services exchange medium. Alternatively, the online test is generated and/or hosted by a third party site. The online test is typically timed. Each online test varies in length and time.

Figures 4, 5:
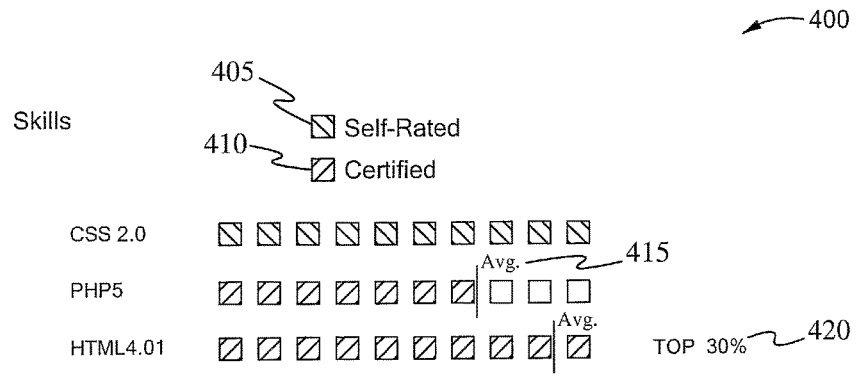
FIG. 4 illustrates an exemplary Skills section in accordance with some embodiments of the present invention.
FIG. 5 illustrates an exemplary Team account in accordance with some embodiments of the present invention.

FIG. 4 illustrates an exemplary Skills section 400 in accordance with the present invention. Skills that are self-assessed are indicated by a first symbol 405; skills that certified are indicated by a second symbol 410. Self-assessing the service provider's proficiency in CSS 2.0, the service provider indicated a skill level of 10. Online tests reveal the service provider's proficiency in PHP5 is at a level 7 and in HTML4.01 is at a level 10. In addition to the service provider's skill levels which are based on the service provider's performances on the tests, the average scores or levels for the tests are also shown. The average scores are indicated with a line 415. The average score for PHP5 is a 7, and the average score for HTML4.01 is a 9. In some embodiments, if the service provider's score is at a top x %, then the appropriate percentage indicator 420 is displayed next to the result. The service provider's score, in some embodiments, must be at the top 30% for the indicator 420 to be displayed. As illustrated, the service provider scored in the top 30% for the HTML4.01 certification.

In some embodiments, the service provider is able to retake a test a unlimited number of times. However, there is a waiting period before the service provider can retake the test. The waiting period is typically two weeks. Alternatively, the service provider is able to retake a test only a predetermined number of times set by the services exchange medium.

In other embodiments, each test will cost the service provider a predetermined amount set by the services exchange medium. Since tests are not free to take and there is a waiting period to take a re-examination, service providers are encouraged to take the tests seriously and diligently, while buyers will be able to reliably depend on and trust the scores that are reflective of the service providers' knowledge. Once the service provider clicks on a "Take Test" button for a skill, the service provider is charged immediately and the test fee is not refundable. If the service provider has test credits, the service provider is able to use these credits each time the service provider takes a test. Alternatively, one or more tests are free to take. For example, an admissions test and/or an English proficiency test are free to take. The admissions test is to ensure that all service providers understand how the services exchange medium works prior to engaging with other users.

In some embodiments, a test syllabus for each skill is provided and indicates the duration of the test as well as other important details surrounding each test (e.g., content, prerequisite knowledge, etc.). In order to pass the test and display the results, the service provider needs to answer, for example, at least 60% of the questions correctly. The service provider is able to revert back to the self-assessment score or delete the skill if the service provider is dissatisfied with the tested score. In other embodiments, the test is considered failed if the service provider does not complete the test and/or runs out of time to complete the test.

Referring back to FIGS. 1A-1B, the service provider's credentials are listed under a Credentials section 110. Typically, the credentials include education, certifications, references, and/or licenses. Other credentials are possible. A verification service is able to verify each credential listed by the service provider. Each verified credential is easily identified with a unique symbol 115 or word or highlighting. Typically, the verification service is provided by the services exchange medium. Alternatively, the verification service is provided by a third party.

Other static data such as an introduction, payment terms, a summary, and a detailed service description are provided as part of the service provider's online professional profile 100. The introduction, which is typically under an About Us section 120, describes and introduces the service provider to the buyers within the services exchange medium. In some embodiments, the introduction includes a profile type, an establishment year, a number of employees, and/or a description. The profile type is an individual or a business. As part of the description, the service provider is able to describe the service provider's professional vision, mission, strengths, approach, infrastructure, growth, and/or future plans.

The payment terms, which is typically under a Payment Terms section 125, specify the terms of payment acceptable to and/or preferred by the service provider. For example, the payment terms specify that the service provider requires a deposit of 50% of a quoted cost before a project startup and a remaining 50% due upon a final completion which follows a review by a buyer. Alternatively, the payment terms specify a payment schedule linked to project milestones specified during negotiations. The payment terms specify a payment using a credit card. Alternatively, the payment terms specify the payment using an escrow service.

The summary, which is typically under a Summary section 130, briefly highlights services, specializations, facts and figures, and/or other information about the service provider. The summary is preferably displayed in an easy-to-read layout such as in a bullet point format.

The detailed service description, which is typically under a Detailed Service Description section 135, expands on the summary provided in the Summary section. In some embodiments, the detailed service description also specifies ownership of a work product, warranty for the work product, maintenance of the work product, buyer responsibilities, and/or third party integrations.

In some embodiments, the online professional profile 100 includes a Keyword Tags section 140 which displays a plurality of keywords carefully chosen by the service provider. The services exchange medium in some embodiments is able to automatically generate keywords based on the service provider's chosen keywords and/or parts of the service provider's online professional profile. The plurality of keywords are descriptors associated with the service provider's professional abilities. As such, the plurality of keywords enable the service provider's online professional profile 100 to be returned as part of a search result when the buyer performs a search for the service provider's expertise within the services exchange medium.

In some embodiments, the online professional profile 100 has a "Profile for" pull-down menu 145 of different experience categories within the services exchange medium. The experience categories include "Software & Technology," "Sales & Marketing," "Administrative Support," "Audio, Video & Multimedia," "Website Development," "Writing & Translation," "Management & Finance," "Architecture & Engineering," "Training & Development," "Legal," "Graphic Design & Art," and "All Categories." Other experience categories are possible. In some embodiments, only those experience categories that the service provider has experience in are part of the "Profile for" pull-down menu 145. In other embodiments, the "Profile for" pull-down menu 145 is set at a default experience category or an experience category that the service provider has the most experience in.

As mentioned above, the service provider's online professional profile includes dynamically generated data. Typically, the dynamically generated data include feedback statistics and experience. A Feedback section 150 automatically generates and displays feedback statistics in a table for a selected experience category. For example, if the "Website Development" category is selected via the "Profile for" pull-down menu 145, then the Feedback section 150 displays statistics regarding "Website Development." In some embodiments, the statistics include, but are not limited to, a percentage of positive feedback, a number of total reviews, a number of completed projects, and earnings for, such as, "Website Development" within a last six months or a time period set by the buyer and/or the service provider. In some embodiments, a lifetime earnings for "Website Development" is also displayed. In other embodiments, the Feedback section 150 also displays a percentage of positive feedback, a number of total reviews, a number of completed projects, and earnings for "All Categories" within the last six months or the time period set by the buyer and/or the service provider. Yet, in other embodiments, a lifetime earnings for "All Categories" is also displayed. If another experience category is selected via the "Profile for" pull-down menu 145, then the Feedback section 150 dynamically generates and displays feedback statistics reflecting the another experience category.

Similarly, an Experience section 155 automatically generates and displays the service provider's experience for the selected experience category. For example, if the "Website Development" is selected via the "Profile For" pull-down menu 145, then the Experience section 155 lists subcategories of "Website Development" in which the service provider has experience in. Each subcategory in some embodiments has an associated number representing a number projects the service provider has completed for that subcategory within the services exchange medium. In some embodiments, each subcategory also has an associated date that the service provider had last completed a project for that subcategory. In other embodiments, each subcategory also has an associated link to a feedback page listing all completed projects for that subcategory. The feedback page is discussed in detail below.

In some embodiments, the service provider's online professional profile 100 includes a minimum hourly rate, a location, a membership date, a date of last sign-in, and/or a date of last feedback received. In other embodiments, a portion of the data provided for the service provider's professional online profile 100 is hidden indefinitely from the buyer. For example, if the service provider has hidden the location from view, then the location is not displayed as part of the service provider's online professional profile 100. Similarly, if the service provider has not entered the minimum hourly rate as part of service provider's online professional profile 100, then the minimum hourly rate is also not displayed as part of the service provider's online professional profile 100.

As mentioned above, the buyer is able to select and view the service provider's online professional profile 100 within the services exchange medium. Data entered but not hidden by the service provider are typically presented on one page for convenience. For example, the minimum hourly rate, the location, the membership date, the date of last sign-in, the date of last feedback, the Summary section 130, the Feedback section 150, the Keyword Tags section 140, the Experience section 155, the Skills section 105, the About Us section 120, the Payment Terms section 125, the Detailed Service Description section 135, and the Credentials section 110 are displayed and organized on the one page, as illustrated in FIGS. 1A-1B. FIG. 1A illustrates a top portion of the one page. FIG. 1B illustrates a bottom portion of the one page. Other sections and presentations are possible.

In some embodiments, the one page also has a link to a weblog (not illustrated). Typically, the weblog is updated and maintained by the service provider. In other embodiments, the one page also has an interactive window 160. Preferably, the interactive window 160 displays an image, a video clip, and/or an audio clip uploaded by the service provider as part as the service provider's online professional profile 100. Typically, the image is a picture of the service provider or is a logo representing the service provider. The image is of jpeg, tiff, gif, bmp, or png format. Other image formats are possible. Typically, the video clip is a visual and personal introduction of the service provider. The video clip is of mpeg-4 format. However, other video formats are possible. Typically, the audio clip is a sound recording of the service provider. The audio clip is of wav, aiff, or wma format. Likewise, other audio formats are possible. The image, the video clip, and/or the audio clip allow the service provider to actively market the service provider as a professional to the buyer within the services exchange medium. The image, the video clip, and/or the audio clip also help the buyer associate the data presented in the online professional profile 100 with human features or characteristics of the service provider. In other embodiments, the one page has more than one interactive window 160 that allows the service provider to upload at least one of the image, the video clip, and the audio clip.

In some embodiments, the one page also has a Contact Me button 165 which allows the buyer to either invite the service provider to bid on a project, to chat with the buyer, or to call the service provider. The Contact Me button 165 provides a direct communication between the service provider and the buyer. Other communication methods are possible. In other embodiments, a current status of the service provider is displayed beneath the Contact Me button 165. The current status of the service provider is offline, online, busy or any other suitable status designations. The current status, in some embodiments, is custom-tailored by the service provider.

Figure 2:
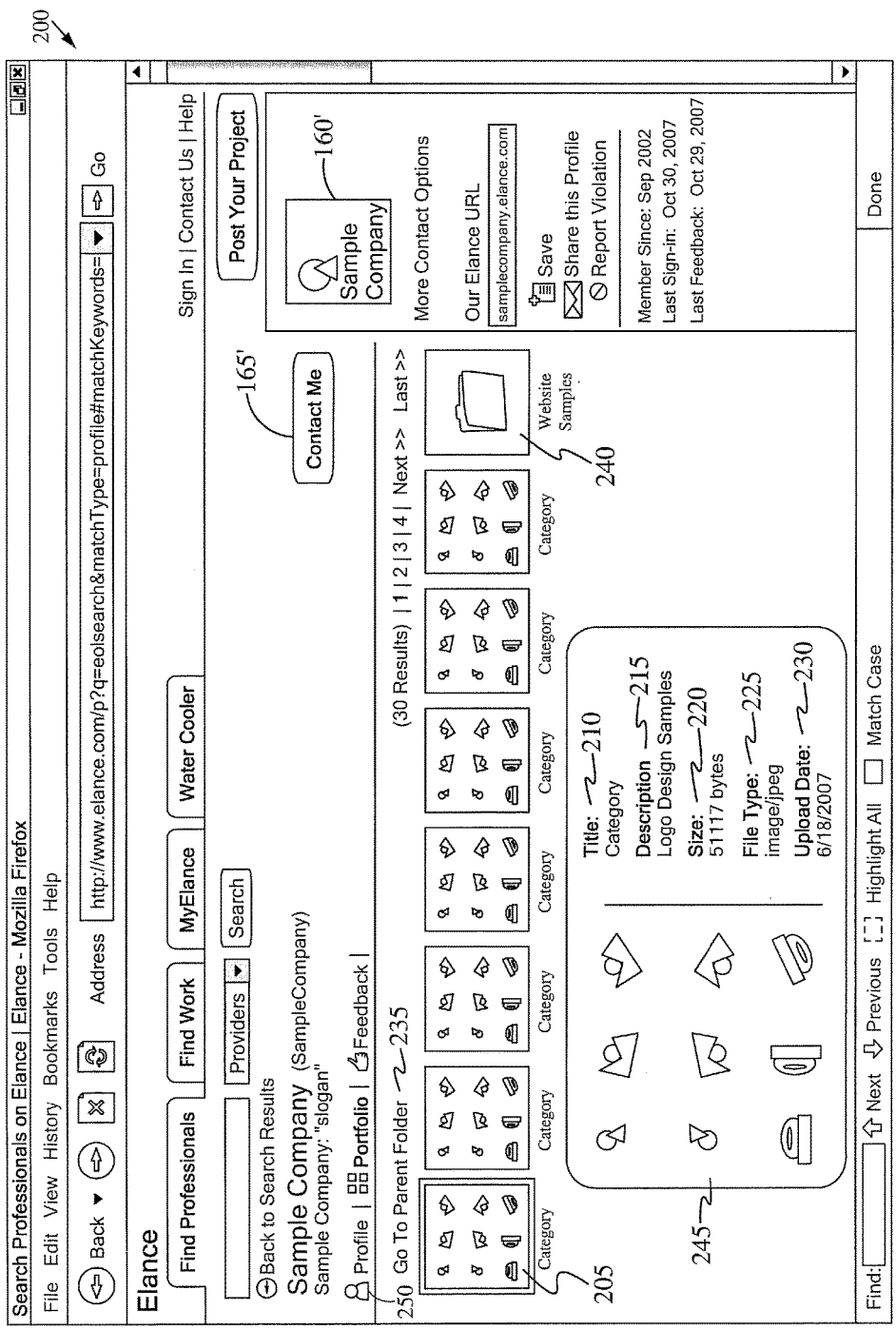
FIG. 2 illustrates an exemplary portfolio page part of the online professional profile provided on the web browser in accordance with some embodiments of the present invention.

In some embodiments, the online professional profile 100 includes a portfolio of the service provider's past work products. Typically, the one page includes a portfolio link 170 to a portfolio page. FIG. 2 illustrates an exemplary portfolio page 200 provided on the web browser in accordance with the present invention. The portfolio page 200 displays snippets 205 of the service provider's past work products uploaded by the service provider. The past work products are work products completed within the services exchange medium, outside the services exchange medium, or both. A past work product uploaded by the service provider is of any file format. For example, the past work product is of a jpeg format, a doe format, a flash format, or any other suitable format. Folders 240 are used to organize and group the past work products. Clicking on a folder 240 allows the buyer to view a group of past work products. A "Go To Parent Folder" link 235 allows the buyer to go back to a parent folder. In some embodiments, each past work product has an image 245, a title 210, a description 215, a size 220, a file type 225, and an upload date 230 associated with the work product displayed beneath the snippets 205. In other embodiments, each past work is associated with other attributes (not illustrated) such a number of times that past work has been viewed by others. Yet, in other embodiments, the buyer is able to select and download a work product to view. The past work displayed is for the snippet of work product selected shown in double borders.

In some embodiments, the portfolio page 200 also has an interactive window 160' and a Contact Me button 165'. The interactive window 160' is similarly configured as the interactive window 160. The Contact Me button 165' is similarly configured as the Contact Me button 165. A profile link 250, when activated, displays profile information described above and as illustrated in FIGS. 1A-1B.

Figure 3:
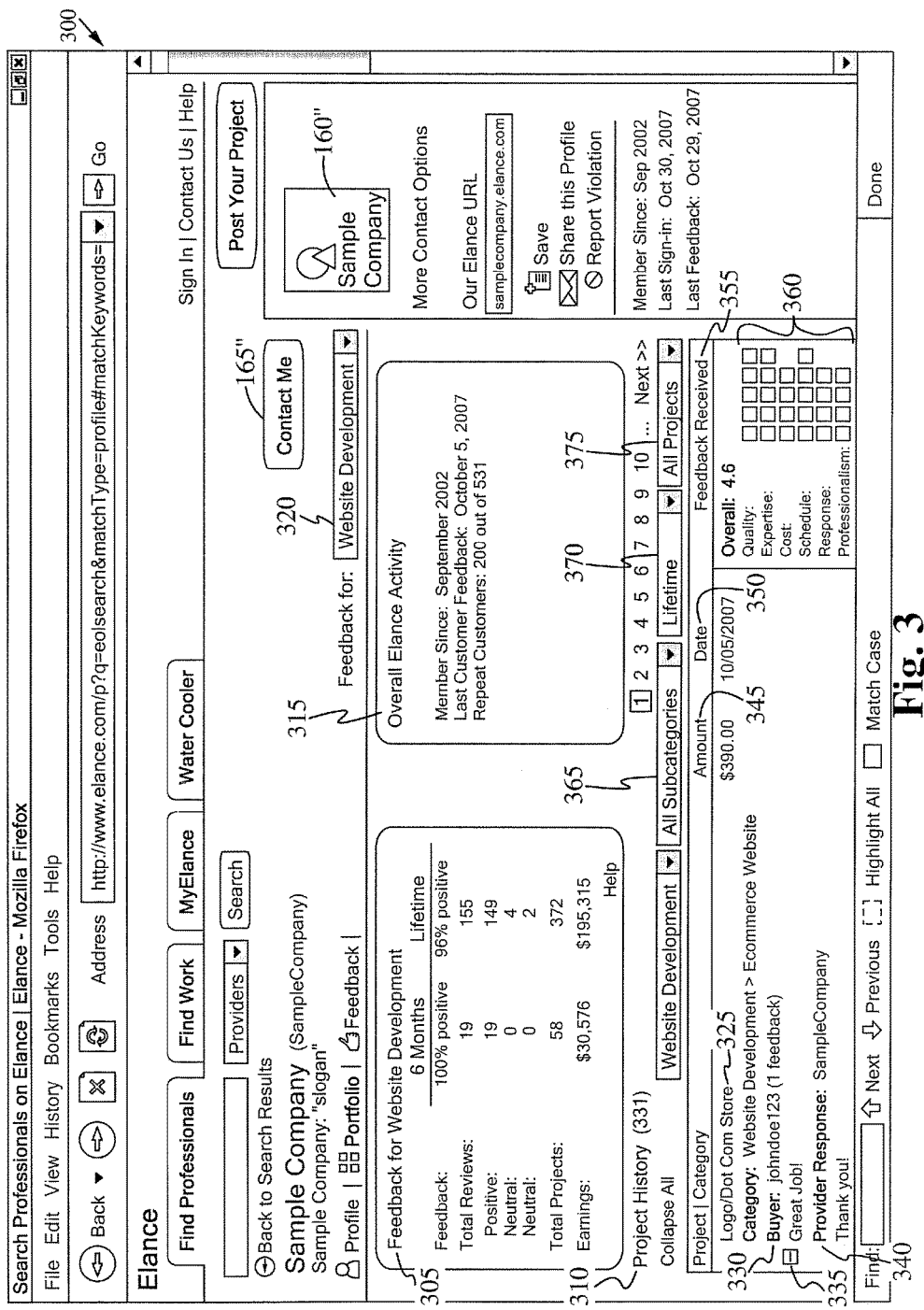
FIG. 3 illustrates an exemplary feedback page part of the online professional profile provided on the web browser in accordance with some embodiments of the present invention.

As mentioned above, the online professional profile 100 also includes the feedback page. Typically, the one page also has a feedback link 175 to the feedback page. FIG. 3 illustrates an exemplary feedback page 300 provided on the web browser in accordance with the present invention. The feedback page 300 is divided in three notable sections. A first section 305 provides feedback statistics for the selected experience category. A second section 310 provides a project history for the selected experience category. A third section 315 provides the service provider's overall activity within the services exchange medium. In some embodiments, a "Feedback for" pull-down menu 320 located on the feedback page 300 allows the buyer to change the feedback page 300 to reflect a different experience category. In some embodiments, the "Feedback for" pull-down menu 320 is set at the default experience category or the experience category that the service provider has the most experience in.

The first section 305 automatically generates and displays feedback statistics in a table for the selected experience category. For example, if the "Website Development" category is selected via the "Feedback for" pull-down menu 320, then the first section 305 displays a percentage of positive feedback, a number of total reviews, a number of positive review, a number of neutral reviews, a number of negative reviews, a number of completed projects, and earnings for "Website Development" within the last six months or the time period set by the buyer and/or the service provider. In some embodiments, a lifetime earnings for "Website Development" is also displayed. In other embodiments, the first section 305 also displays a percentage of positive feedback, a number of total reviews, a number of positive review, a number of neutral reviews, a number of negative reviews, a number of completed projects, and earnings for "All Categories" within the last six months or the time period set by the buyer and/or the service provider. Yet, in other embodiments, a lifetime earnings for "All Categories" is also displayed. If another experience category is selected via the "Feedback for" pull-down menu 320, then the first section 305 dynamically generates and displays feedback statistics reflecting the another experience category.

The second section 310 displays a project history for the selected experience category. The project history lists all completed projects for the selected experience category within the services exchange medium. Each completed project listed is associated with a title 325, a project buyer 330, a comment by the project buyer 335, a corresponding response 340 to the project buyer's comment, a cost amount for the completed project 345, a date associated with the completed project 350, and/or a feedback received 355. The feedback received 355 includes a quantitative score for each feedback factor 360. Feedback factors 360 include but are not limited to quality, expertise, cost, schedule, response, and professionalism. Typically, the quantitative score is based on a scale of five. In some embodiments, each project buyer listed has an associated link to that project buyer's profile within the services exchange medium. In other embodiments, the buyer is able to contact a project buyer regarding a corresponding completed project.

In some embodiments, the online professional profile 100 allows the buyer to refine the project history for the selected experience category displayed in the second section 310. For example, the buyer is able to view projects for a particular subcategory via a "Subcategories" pull-down menu 365. The buyer is also able to view a list of all projects completed during a lifetime, projects completed within a last six months, or projects completed within a time period set by the buyer and/or the service provider via a "Period" pull-down menu 370. In addition, the buyer is able to view all completed projects, all completed projects with feedback received, all completed projects with positive feedback, all completed projects with neutral feedback, or all completed projects with negative feedback via "Projects" pull-down menu 375. In other embodiments, the online professional profile 100 allows the buyer to sort the project history for the selected experience category by subcategories, cost amounts, dates, and feedback received. Other sorts are possible.

The third section 315 displays information about the service provider's overall activity within the services exchange medium. In some embodiments, a date of membership, a date of last feedback, and a number of repeat customers are displayed. Other information regarding the service provider's overall activity within the services exchange medium are possible.

In some embodiments, the feedback page 300 has an interactive window 160" and a Contact Me button 165". The interactive window 160" is similarly configured as the interactive window 160. The Contact Me button 165" is similarly configured as the Contact Me button 165.

Accordingly, the online professional profile 100 is a combination of data describing the service provider as a professional. A unique combination of data of automatically generated data, the weblog, the portfolio, the feedback, the image, the video clip, and/or the sound clip, allows the buyer to make an informed hiring decision instantly.

The online professional profile 100 in some embodiments displays when the service provider became a member, when the service provider last signed into the service provider's online professional profile 100, and when the service provider received a last feedback from a buyer. The online professional profile 100 in other embodiments allows a viewer to save and/or share the online professional profile 100, and even to report a violation.

In some embodiments, the online professional profile 100 encompasses profile information described above and as illustrated in FIGS. 1A-1B, data from the portfolio page 200, and/or data from the feedback page 300.

As stated above, the service provider within the services exchange medium can be an individual or a business. A business provider in some embodiments is able to add additional team members by signing up for a Team account. A Team account is typically available to those providers with a small or large business membership. A business provider with a small business membership is able to add up to, for example, five additional team members. A business provider with a large business membership is able to add a unlimited number of additional team members. Each team member has a unique username and password. Team members can access workrooms to chat with the buyers, send private messages, upload files, track time and progress, and update status.

The original person who signed up for the Team account is the account Owner. Any additional team members are assigned the role of an Administrator, Manager or Consultant. Such designation allows ownership of jobs to be assigned to a team member. The Owner has complete control of the account and cannot be deleted. An Administrator also has the same access as the Owner, except their accounts can be deleted by the Owner or another Administrator. A Manager has access to jobs and is responsible for submitting proposals, negotiating terms, managing projects, delivering work and billing. However, the Manager does not have access to the company profile, account and membership related activities such as team administration, withdrawing money, reviewing account transaction history, or changing membership plan. A Consultant works with project leaders to submit the job deliverables to the buyers; this role typically can only access the job workroom, shared files, private messages, tracker and submit time via the status reports.

To establish job ownership and enable accountability, team members should be assigned as project leaders to the jobs that the business or company has been hired for. Only team members with a Owner, Administrator or Manager role can be assigned project leaders to a job. The project leaders of a job manages communication with the buyer, submit statuses and delivers work. The Owner and Administrator are able to easily track status of jobs managed by specific project leaders and re-assign if needed. Project leaders receive private message and other email notifications related to jobs they manage. After the business provider is hired for a job, the person who submitted the proposal automatically becomes the project leader. Project leaders can re-assign their jobs to other team members if needed.

FIG. 5 illustrates an exemplary team account 500 in accordance with the present invention. The team account 500 shows the team member names in the Name column 505, the team member user names in the Username column 510, the team member roles in the Roles column 515, assigned jobs in the Assigned Jobs column 520, and actions to be taken in the Actions column 525. In some embodiments, a short description for each job is also displayed in the Assigned Jobs column 520. Actions include editing information about a team member or deleting a team member from the team account. Any team member, except for the Owner, can be deleted. Additional team members are added via the Add Team Member link 530. It should be understood that the organization of information in FIG. 5 is only exemplary. More or less information can be displayed.

The Team account feature allows the business provider to control access to cash withdraw and other sensitive information by role, to control job ownership to a project leader ensuring accountability, and to create more visibility to team members with multiple user profiles. The Team account feature makes it easier for people in the same company to organize as a team and work together.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions to the online professional profile will occur. Consequently, the claims should be broadly construed, consistent with the spirit and scope of the invention, and should not be limited to their exact, literal meaning.

We claim:

1. A non-transitory computer readable medium storing instructions that, when executed by a computing device, cause the computing device to perform a method of optimizing performance in a services exchange medium, the method comprising:
   continuously determining, by the computing device, a current average proficiency level of each professional skill of service providers among service providers participating within the services exchange medium who possess a corresponding professional skill;
   generating, by the computing device, an interactive professional profile of a service provider participating in the services exchange medium, the professional profile comprising:
     static data comprising one or more professional skills of the service provider, wherein each of the one or more professional skills is associated with an indicator indicating the average proficiency level for and an indicator indicating the service provider's proficiency level for the corresponding professional skill, wherein the indicator for the average proficiency level reflects the current average proficiency level for the corresponding professional skill of those service providers participating in the services exchange medium who possess the corresponding professional skill;
     dynamic information, wherein a first portion of the dynamic information is provided by the service provider, a second portion of the dynamic information is automatically generated, and a third portion of the dynamic information is provided by an at least one buyer;
     a keyword tags section including one or more keywords associated with professional attributes of the service providers that are provided by the service provider;
     a communication feature comprising a plurality of communication options, each option configured to provide direct communication with the service provider from within the profile; and
     a pull-down menu including a unique list of selectable experience categories, wherein a selection of a selectable experience category reduces an amount of content to be shown in the profile by rendering a portion of the static data and the dynamic information that is only associated with the selected experience category such that the entirety of the static data and the dynamic information is not rendered simultaneously to thereby improve overall throughput of the computing device, wherein the unique list only includes experience categories that the service provider has experience in;
   automatically generating, by the computing device, at least one new keyword based on one or more sections of the professional profile;
   including, by the computing device, the at least one new keyword in the keyword tags section of the professional profile; and
   transmitting, by the computing device, the professional profile for display.

2. The non-transitory computer readable medium of claim 1 wherein proficiency of each skill is self-assessed or determined by a test.

3. The non-transitory computer readable medium of claim 1 wherein the static data comprises credentials, the credentials are verifiable, wherein verified credentials are indicated as verified.

4. The non-transitory computer readable medium of claim 1 wherein the first portion comprises a portfolio of completed work products uploaded by the service provider.

5. The non-transitory computer readable medium of claim 1 wherein the first portion comprises at least one interactive window configured to display at least one of an image, a video clip, and an audio clip.

6. The non-transitory computer readable medium of claim 1 wherein the second portion comprises experience, the experience automatically expands as projects are completed by the service provider within the services exchange medium.

7. The non-transitory computer readable medium of claim 1 wherein the third portion comprises feedback statistics for the selected experience category, wherein the feedback statistics are based on feedback provided by the at least one buyer, wherein the feedback statistics reflects another experience category when the another experience category selected.

8. The non-transitory computer readable medium of claim 1 wherein dynamic information is for a first set rules selected by user and is different when a second set of rules is selected by the user.

9. The non-transitory computer readable medium of claim 1 wherein the communication feature is one of a chat, a call, and an invitation to bid.

10. The non-transitory computer readable medium of claim 1 wherein the professional profile includes a feature configured to perform one or more actions on the professional profile once the feature is activated by the user.

11. A non-transitory computer readable medium storing instructions that, when executed by a computing device, cause the computing device to perform a method of optimizing performance in a services exchange medium, the method comprising:
   continuously determining, by the computing device, a current average proficiency level of each professional skill of service providers among service providers participating within the services exchange medium who possess a corresponding professional skill;
   generating, by the computing device, a dynamic online profile of a service provider participating in the services exchange medium, the online profile comprising:
     data comprising one or more professional skills of the service provider, wherein each of the one or more professional skills is listed together with an indicator indicating the service provider's proficiency level for and an indicator indicating the average proficiency level for the corresponding professional skill, wherein the indicator for the average proficiency level reflects the current average proficiency level for the corresponding professional skill of those service providers participating in the services exchange medium who possess the corresponding professional skill;
     a portfolio including work products completed by the service provider;

a keyword tags section including an at least one keyword associated with a professional ability of the service provider that are provided by the service provider;

a communication feature comprising a plurality of communication options, each option configured to provide direct communication with the service provider from within the online profile such that a user remains within the professional profile when communicating with the service provider; and a pull-down feature that includes, according to projects completed within the services exchange medium, a dynamic list of selections of experience categories that the service provider has experience in but does not include selections for experience categories that the service provider does not have experience in, and is automatically set at a default selection for an experience category that the service provider has the most experience in, to improve overall throughput of the computing device by reducing an amount of content to be shown in the profile by rendering a portion of the static data and the dynamic information that is only associated with a selected experience category such that the entirety of the static data and the dynamic information is not rendered simultaneously;

automatically generating, by the computing device, at least one new keyword based on one or more sections of the online profile;

including, by the computing device, the at least one new keyword in the keyword tags section of the online profile; and transmitting, by the computing device, the online profile for display.

12. The non-transitory computer readable medium of claim 11 wherein the data is grouped into sections including an experience section, a skills section, and a credentials section.

13. The non-transitory computer readable medium of claim 12 wherein the experience section is automatically generated from and expands as projects are completed by the service provider within the services exchange medium.

14. The non-transitory computer readable medium of claim 12 wherein the skills section is configured to allow the service provider to self-assess or to take tests to assess proficiency of skills listed therein.

15. The non-transitory computer readable medium of claim 12 wherein the credentials section lists credentials, the credentials are verifiable.

16. The non-transitory computer readable medium of claim 11 wherein the communication feature is one of a chat, a call, and an invitation to bid.

17. The non-transitory computer readable medium of claim 11 wherein the online profile further comprises feedback provided by a buyer, the feedback is associated with a project completed by the service provider.

18. The non-transitory computer readable medium of claim 11 wherein the online profile is configured as a team account to allow people in a company to organize as a team and work together.

19. A non-transitory computer-readable medium storing instructions that, when executed by a computing device, cause the computing device to perform a method of optimizing performance in a services exchange medium, the method comprising:

continuously determining, by the computing device, a current average proficiency level of each professional skill of service providers among service providers participating within the services exchange medium who possess a corresponding professional skill;

generating, by the computing device, an evolving profile of a service provider participating in the services exchange medium, the profile comprising:

professional information including one or more professional skills of the service provider, wherein each of the one or more professional skills is listed together with an indicator indicating the service provider's proficiency level for and an indicator indicating the average proficiency level for the corresponding professional skill, wherein the indicator for the average proficiency level reflects the current average proficiency level for the corresponding professional skill of those service providers participating in the services exchange medium who possess the corresponding professional skill;

a keyword tags section including an at least one keyword associated with a professional ability of the service provider and provided by the service provider;

a pull-down feature that includes, according to projects completed within the services exchange medium, a dynamic list of selections of experience categories that the service provider has experience in but does not include selections for experience categories that the service provider does not have experience in, and is automatically set at a default selection for an experience category that the service provider has the most experience in, to improve overall throughput of the computing device by reducing an amount of content to be shown in the profile by rendering a portion of the static data and the dynamic information that is only associated with a selected experience category such that the entirety of the static data and the dynamic information is not rendered simultaneously; and a communication feature comprising a plurality of communication options, each option configured to provide direct communication with the service provider from within the profile such that a user remains within the professional profile when communicating with the service provider;

automatically generating, by the computing device, at least one new keyword based on the one or more keywords provided by the service provider;

including, by the computing device, the at least one new keyword in the keyword tags section of the evolving profile such that the evolving profile has a higher likelihood of being returned as part of a search result than without the at least one new keyword included in the keyword tags section; and updating, by the computing device, the evolving profile based on new data that is obtained within the services exchange medium for the service provider.

20. The non-transitory computer-readable medium of claim 19 wherein proficiency of each skill is self-assessed or determined by a test and is indicated with the corresponding skill.

21. The non-transitory computer-readable medium of claim 19 wherein the professional information includes feedback from an at least one past buyer.

22. The non-transitory computer-readable medium of claim 19 wherein the professional information includes a portfolio of work products completed by the service provider.

23. The non-transitory computer-readable medium of claim 19 wherein the profile is configured as a team account to allow designated team members, each having a unique log in, to access privileged areas of the team account depending on assigned roles of the team members.

24. The non-transitory computer-readable medium of claim 1 wherein the profile further comprises a current status of the service provider.

25. The non-transitory computer-readable medium of claim 10 wherein the user is not the owner of the professional profile, and wherein the actions include saving the profile, sharing the profile, and reporting a violation.

26. The non-transitory computer-readable medium of claim 1 wherein the dynamic information is shown across a plurality of pages, wherein the communication feature is displayed in each of the plurality of pages.

* * * * *

UNITED STATES PATENT AND TRADEMARK OFFICE
CERTIFICATE OF CORRECTION

PATENT NO. : 10,204,074 B1  
APPLICATION NO. : 12/474127  
DATED : February 12, 2019  
INVENTOR(S) : Jonathan P. Diller, Sunny SunMin Song and Fabio Rosati Page 1 of 1

It is certified that error appears in the above-identified patent and that said Letters Patent is hereby corrected as shown below:

In the Specification

<u>In the Detailed Description - Column 8, Line 2:</u>
Replace "Doe" with –Doc–

Signed and Sealed this
Thirtieth Day of August, 2022

Katherine Kelly Vidal
*Director of the United States Patent and Trademark Office*